US012087221B2

(12) United States Patent
Li

(10) Patent No.: US 12,087,221 B2
(45) Date of Patent: Sep. 10, 2024

(54) PIXEL COMPENSATION CIRCUIT, METHOD AND DISPLAY PANEL

(71) Applicant: TCL CHINA STAR OPTOELECTRONICS TECHNOLOGY CO., LTD., Guangdong (CN)

(72) Inventor: Jialong Li, Guangdong (CN)

(73) Assignee: TCL CHINA STAR OPTOELECTRONICS TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 17/623,568

(22) PCT Filed: Dec. 22, 2021

(86) PCT No.: PCT/CN2021/140374
§ 371 (c)(1),
(2) Date: Jun. 22, 2023

(87) PCT Pub. No.: WO2023/108746
PCT Pub. Date: Jun. 22, 2023

(65) Prior Publication Data

US 2024/0046865 A1 Feb. 8, 2024

(30) Foreign Application Priority Data

Dec. 16, 2021 (CN) ......................... 202111546366.5

(51) Int. Cl.
*G09G 3/30* (2006.01)
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/043* (2013.01); *G09G 2310/08* (2013.01)

(58) Field of Classification Search
CPC ............... G09G 3/3233; G09G 3/3291; G09G 2300/043; G09G 2310/0264; G09G 2310/08
See application file for complete search history.

(56) References Cited

U.S. PATENT DOCUMENTS 10,535,306 B2 * 1/2020 Yang .................... G09G 3/3233
11,386,849 B2 * 7/2022 Lee ...................... H10K 59/353
(Continued)

FOREIGN PATENT DOCUMENTS

CN 203480809 U 3/2014
CN 104134426 A 11/2014
(Continued)

OTHER PUBLICATIONS

International Search Report in International application No. PCT/CN2021/140374, mailed on Sep. 1, 2022.
(Continued)

*Primary Examiner* — Joe H Cheng
(74) *Attorney, Agent, or Firm* — PV IP PC; Wei Te Chung; Zhigang Ma

(57) ABSTRACT

The application provides a pixel compensation circuit, method and display panel. By use of a same data line, a first compensation sub-circuit and a second compensation sub-circuit drive a first pixel unit and a second pixel unit to emit light in a first period and a second period of display duration of each frame, respectively. In this way, both the first pixel unit and the second pixel unit are driven to emit light in each frame. Therefore, the number of the data lines can be reduced to a half, and it benefits in reducing pixel layout
(Continued)

space and pixel size, thereby realizing high-resolution performance of the display panel.

17 Claims, 7 Drawing Sheets

(56) References Cited

U.S. PATENT DOCUMENTS

| | | | | |
|---|---|---|---|---|
| 11,501,707 | B2* | 11/2022 | Yu | G09G 3/3233 |
| 2015/0235595 | A1 | 8/2015 | Sugihara et al. | |
| 2019/0035334 | A1 | 1/2019 | Lin et al. | |
| 2021/0035501 | A1* | 2/2021 | Feng | G09G 3/3283 |
| 2021/0064170 | A1* | 3/2021 | Hwang | G09G 3/2092 |
| 2021/0335232 | A1* | 10/2021 | Jiang | G09G 3/3233 |
| 2021/0366383 | A1* | 11/2021 | Ma | G09G 3/3233 |
| 2022/0101780 | A1* | 3/2022 | Xiao | G09G 3/32 |

FOREIGN PATENT DOCUMENTS

| | | | |
|---|---|---|---|
| CN | 104252845 | A | 12/2014 |
| CN | 105575330 | A | 5/2016 |
| CN | 108877651 | A | 11/2018 |
| CN | 109523954 | A | 3/2019 |
| CN | 109559679 | A | 4/2019 |
| CN | 111402802 | A | 7/2020 |
| CN | 212365461 | U | 1/2021 |
| KR | 20160083445 | A | 7/2016 |

OTHER PUBLICATIONS

Written Opinion of the International Search Authority in International application No. PCT/CN2021/140374, mailed on Sep. 1, 2022.

Chinese Office Action issued in corresponding Chinese Patent Application No. 202111546366.5 dated Sep. 29, 2022, pp. 1-10.

* cited by examiner

PIXEL COMPENSATION CIRCUIT, METHOD AND DISPLAY PANEL

CROSS-REFERENCE TO RELATED APPLICATIONS

This application is a National Phase of PCT Patent Application No. PCT/CN2021/140374 having International filing date of Dec. 22, 2021, which claims the benefit of priority of Chinese Patent Application No. 202111546366.5 filed on Dec. 16, 2021. The contents of the above applications are all incorporated by reference as if fully set forth herein in their entirety.

FIELD OF THE DISCLOSURE

The present application relates to display technologies, and more particularly to a pixel compensation circuit, method and display panel.

DESCRIPTION OF RELATED ARTS

Organic light emitting diode (OLED) is a current-type organic light emitting device that emit light by injection and recombination of carriers, and the light intensity is proportional to the injected current.

In an OLED display panel, each pixel includes an organic light emitting diode and a pixel driving circuit for driving the organic light emitting diode. In the pixel driving circuit, a current flowing through a driving transistor is represented by $I=K(Vgs-Vth)^2$, where K is an intrinsic conductivity factor of the driving transistor, Vgs is a potential difference between the gate and the source of the driving transistor, and Vth is the threshold voltage of the driving transistor. It can be known from the formula that the current flowing through the driving transistor, the current used to drive the organic light emitting diode to emit light, is related to the threshold voltage of the driving transistor. However, since the processes to manufacture the display panels are not identical and the threshold voltage of each driving transistor may differ, this results uneven display brightness. In addition, with the use of the display panels, the transistors will age and change such that a drift occurs on the threshold voltage of each transistor. Also, the degree of aging of each driving transistor is different such that the threshold voltage of each driving transistor drifts for a different degree. This will also cause unstable and uneven display brightness.

SUMMARY

Technical Problems

To solve above problems, a pixel compensation circuit that can compensate the threshold voltage of the driving transistor is usually used to eliminate the influence of the threshold voltage and mobility of the driving transistor on the uniformity of light emission. However, at present, the number of data lines included in each pixel structure is usually large. It is not beneficial in reducing pixel layout space and realizing high resolution.

Technical Solutions

To solve above problems, the embodiments of the present invention provide a pixel compensation circuit, method and display panel, the purpose of which is to utilize a same data line to carry out data transmission for two pixel units within display duration of each frame such that both the two pixel units emit light in the display duration of one frame.

In a first aspect, the embodiments of the present invention provide a pixel compensation circuit, including:

a first compensation sub-circuit, configured to drive a first pixel unit;

a second compensation sub-circuit, configured to drive a second pixel unit;

the first compensation sub-circuit and the second compensation sub-circuit are connected to a same data line and a same scan line;

display duration of each frame includes a first period and a second period in order, and in the first period, the first compensation sub-circuit drives the first pixel unit to emit light; in the second period, the first compensation sub-circuit performs compensation and keeps the first pixel unit emitting light and the second compensation sub-circuit performs compensation and drives the second pixel unit to emit light.

In some embodiments, the first compensation sub-circuit comprises an eleventh transistor, a twelfth transistor, a thirteenth transistor and a first capacitor; and wherein a gate of the eleventh transistor is connected to the scan line, a source of the eleventh transistor is connected to the data line, a drain of the eleventh transistor is connected to the gate of the twelfth transistor and a first end of the first capacitor, the source of the twelfth transistor is connected to a constant high voltage level terminal, the drain of the twelfth transistor is connected to a second end of the first capacitor and the drain of the thirteenth transistor, the gate of the thirteenth transistor is connected to a first compensation control line, and the source of the thirteenth transistor is connected to a first compensation line.

In some embodiments, the second compensation sub-circuit comprises a twenty-first transistor, a twenty-second transistor, a twenty-third transistor, a twenty-fourth transistor, a twenty-fifth transistor, a second capacitor and a third capacitor; and wherein the gate of the twenty-first transistor is connected to the source of the twenty-fifth transistor and a first end of the third capacitor, the source of the twenty-first transistor is connected to the data line, the drain of the twenty-first transistor is connected to the gate of the twenty-third transistor, a first end of the second capacitor and the drain of the twenty-second transistor, the source of the twenty-third transistor is connected to the constant high voltage level terminal, the gate and the drain of the twenty-fifth transistor are connected to the scan line, the gate of the twenty-second transistor is connected to a second compensation control line, the source of the twenty-second transistor is connected to a second compensation line and a second end of the second capacitor, the gate of the twenty-fourth transistor is connected to the first compensation control line, the source of the twenty-fourth transistor is connected to the second compensation line, and the drain of the twenty-fourth transistor is connected to a second end of the third capacitor.

In some embodiments, in the first period, the eleventh transistor, the twelfth transistor, the twenty-fifth transistor, the twenty-first transistor and the twenty-second transistor are turned on and the thirteenth transistor, the twenty-third transistor and the twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

In some embodiments, in the first period, the scan line and the second compensation control line provide a high voltage level, the data line provides a first data voltage and the first compensation control line and the second compensation line provide a low voltage level; and in the second period, the scan line and the second compensation control line provide a low voltage level, the data line provides a second data voltage; the first compensation line provides a first compensation voltage to compensate a threshold voltage of the twelfth transistor via the first capacitor C1; the second compensation line provides a second compensation voltage to compensate the threshold voltage of the twenty-third transistor via the second capacitor and keeps the gate voltage of the twenty-first transistor via the third capacitor.

In some embodiments, in a detection period before the first period, by use of a reference voltage provided by the scan line and the data line, the first compensation sub-circuit and the second compensation sub-circuit detect the threshold voltage of the twelfth transistor and the threshold voltage of the twenty-third transistor, respectively.

In a second aspect, the embodiments of the present invention provide a pixel compensation method, used for the afore-described pixel compensation circuit, the pixel compensation method includes the steps of:

in the first period of the display duration of each frame, utilizing the first compensation sub-circuit to drive the first pixel unit to emit light by use of the scan line and a first data voltage provided by the data line, and utilizing the second compensation sub-circuit to release the first data voltage such that the second pixel unit does not emit light; and in the second period of the display duration of each frame, utilizing the first compensation sub-circuit to perform compensation and keep the first pixel unit emitting light, and utilizing the second compensation sub-circuit to perform compensation and drive the second pixel unit to emit light by use of a second data voltage provided by the data line.

In some embodiments, in the first period, the eleventh transistor, the twelfth transistor, the twenty-fifth transistor, the twenty-first transistor and the twenty-second transistor are turned on and the thirteenth transistor, the twenty-third transistor and the twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

In some embodiments, in the first period, the scan line and the second compensation control line provide a high voltage level, the data line provides a first data voltage and the first compensation control line and the second compensation line provide a low voltage level; and in the second period, the scan line and the second compensation control line provide a low voltage level, the data line provides a second data voltage; the first compensation line provides a first compensation voltage to compensate a threshold voltage of the twelfth transistor via the first capacitor C1; the second compensation line provides a second compensation voltage to compensate the threshold voltage of the twenty-third transistor via the second capacitor and keeps the gate voltage of the twenty-first transistor via the third capacitor.

In some embodiments, before the first period, the pixel compensation method further comprises the following step:

in a detection period, by use of a reference voltage provided by the scan line and the data line, utilizing the first compensation sub-circuit and the second compensation sub-circuit to detect the threshold voltage of the twelfth transistor and the threshold voltage of the twenty-third transistor, respectively.

In some embodiments, in the detection period, by use of the reference voltage provided by the scan line and the data line, the utilizing the first compensation sub-circuit to detect the threshold voltage of the twelfth transistor comprises:

providing a high voltage level by the scan line to turn on the eleventh transistor;

providing the reference voltage by the data line to turn on the twelfth transistor;

lifting up the source potential of the twelfth transistor by a constant high voltage level terminal until the twelfth transistor is turned off such that the threshold voltage of the twelfth transistor is detected from the source of the twelfth transistor.

In some embodiments, in the detection period, by use of the reference voltage provided by the scan line and the data line, the utilizing the second compensation sub-circuit to detect the threshold voltage of the compensation twenty-third transistor comprises:

providing a high voltage level by the scan line to turn on the twenty-fifth transistor and the twenty-first transistor;

providing the reference voltage by the data line to turn on the twenty-third transistor;

lifting up the source potential of the twenty-third transistor by a constant high voltage level terminal until the twenty-third transistor is turned off such that the threshold voltage of the twenty-third transistor is detected from the source of the twenty-third transistor.

In some embodiments, in the second period, the gate of the twelfth transistor is compensated by use of the detected threshold voltage of the twelfth transistor with a help of the first compensation voltage provided by the first compensation line.

In some embodiments, in the second period, the gate of the twenty-third transistor is compensated by use of the detected threshold voltage of the twenty-third transistor with a help of the second compensation voltage provided by the second compensation line.

In a third aspect, the embodiments of the present invention provide a display panel, including a first pixel unit, a second pixel unit and the afore-described pixel compensation circuit; the first pixel unit comprises a first organic light emitting diode, and the second pixel unit comprises a second organic light emitting diode; the first organic light emitting diode is coupled between the drain of the twelfth transistor of the first compensation sub-circuit of the pixel compensation circuit and a constant low voltage level terminal; the second organic light emitting diode is coupled between the drain of the twenty-third transistor of the second compensation sub-circuit of the pixel compensation circuit and the constant low voltage level terminal, wherein the first compensation sub-circuit and the second compensation sub-circuits are configured to drive the first organic light emitting diode to emit light in the first period and the second period that are arranged in order in display duration of each frame and to drive the second organic light emitting diode to emit light in the second period.

In some embodiments, the first compensation sub-circuit comprises an eleventh transistor, a twelfth transistor, a thirteenth transistor and a first capacitor;

wherein a gate of the eleventh transistor is connected to the scan line, a source of the eleventh transistor is connected to the data line, a drain of the eleventh transistor is connected to the gate of the twelfth transistor and a first end of the first capacitor, the source of the twelfth transistor is connected to a constant high voltage level terminal, the drain of the twelfth transistor is connected to a second end of the first capacitor and the drain of the thirteenth transistor, the gate of the thirteenth transistor is connected to a first compensation control line, and the source of the thirteenth transistor is connected to a first compensation line.

In some embodiments, the second compensation sub-circuit comprises a twenty-first transistor, a twenty-second transistor, a twenty-third transistor, a twenty-fourth transistor, a twenty-fifth transistor, a second capacitor and a third capacitor;

wherein the gate of the twenty-first transistor is connected to the source of the twenty-fifth transistor and a first end of the third capacitor, the source of the twenty-first transistor is connected to the data line, the drain of the twenty-first transistor is connected to the gate of the twenty-third transistor, a first end of the second capacitor and the drain of the twenty-second transistor, the source of the twenty-third transistor is connected to the constant high voltage level terminal, the gate and the drain of the twenty-fifth transistor are connected to the scan line, the gate of the twenty-second transistor is connected to a second compensation control line, the source of the twenty-second transistor is connected to a second compensation line and a second end of the second capacitor, the gate of the twenty-fourth transistor is connected to the first compensation control line, the source of the twenty-fourth transistor is connected to the second compensation line, and the drain of the twenty-fourth transistor is connected to a second end of the third capacitor.

In some embodiments, in the first period, the eleventh transistor, the twelfth transistor, the twenty-fifth transistor, the twenty-first transistor and the twenty-second transistor are turned on and the thirteenth transistor, the twenty-third transistor and the twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

In some embodiments, in the first period, the scan line and the second compensation control line provide a high voltage level, the data line provides a first data voltage and the first compensation control line and the second compensation line provide a low voltage level; and in the second period, the scan line and the second compensation control line provide a low voltage level, the data line provides a second data voltage; the first compensation line provides a first compensation voltage to compensate a threshold voltage of the twelfth transistor via the first capacitor C1; the second compensation line provides a second compensation voltage to compensate the threshold voltage of the twenty-third transistor via the second capacitor and keeps the gate voltage of the twenty-first transistor via the third capacitor.

In some embodiments, in a detection period before the first period, by use of a reference voltage provided by the scan line and the data line, the first compensation sub-circuit and the second compensation sub-circuit detect the threshold voltage of the twelfth transistor and the threshold voltage of the twenty-third transistor, respectively.

Beneficial Effects

In the pixel compensation circuit, method and display panel provided in the embodiments of the present invention, by use of a same data line, the first compensation sub-circuit and the second compensation sub-circuit drive the first pixel unit and the second pixel unit to emit light in display duration of each frame, respectively. Specifically, the display duration of each frame includes a first period and a second period in order. Firstly, in the first period, the first compensation sub-circuit drives the first pixel unit 10 to emit light based on the first data voltage provided by the data line, and meanwhile the second compensation sub-circuit releases the first data voltage provided by the data line such that the second pixel unit does not emit light. After that, in the second period, the first compensation sub-circuit performs compensation and keeps the first pixel emitting light, and meanwhile the second compensation sub-circuit performs compensation and drives the second pixel unit to emit light based on the second data voltage provided by the data line. In this way, by use of a same data line, both the first pixel unit and the second pixel unit are driven to emit light in the display duration of each frame. Therefore, the number of the data lines can be reduced to a half, and it benefits in reducing pixel layout space and pixel size, thereby realizing high-resolution performance of the display panel.

DESCRIPTION OF EMBODIMENTS OF THE DISCLOSURE

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

In all of the embodiments of the present invention, in order to distinguish two electrodes of a transistor except for a gate, one of the two electrodes is called a source and the other of the two electrodes is called a drain. Since the source and the drain of the transistor are symmetrical in a sense, the source and the drain are interchangeable. A middle end of the transistor is a gate, a signal input end of the transistor is a source and a signal output end of the transistor is the drain, as specified according to a shape or pattern shown in the appending figures. In addition, the transistors utilized in the embodiments of the present application may include P-type transistors and/or N-type transistors. The P-type transistor is turned on when the gate is at low voltage level and is turned off when the gate is at high voltage level; the N-type transistor is turned on when the gate is at high voltage level and is turned off when the gate is at low voltage level.

Figure 1:
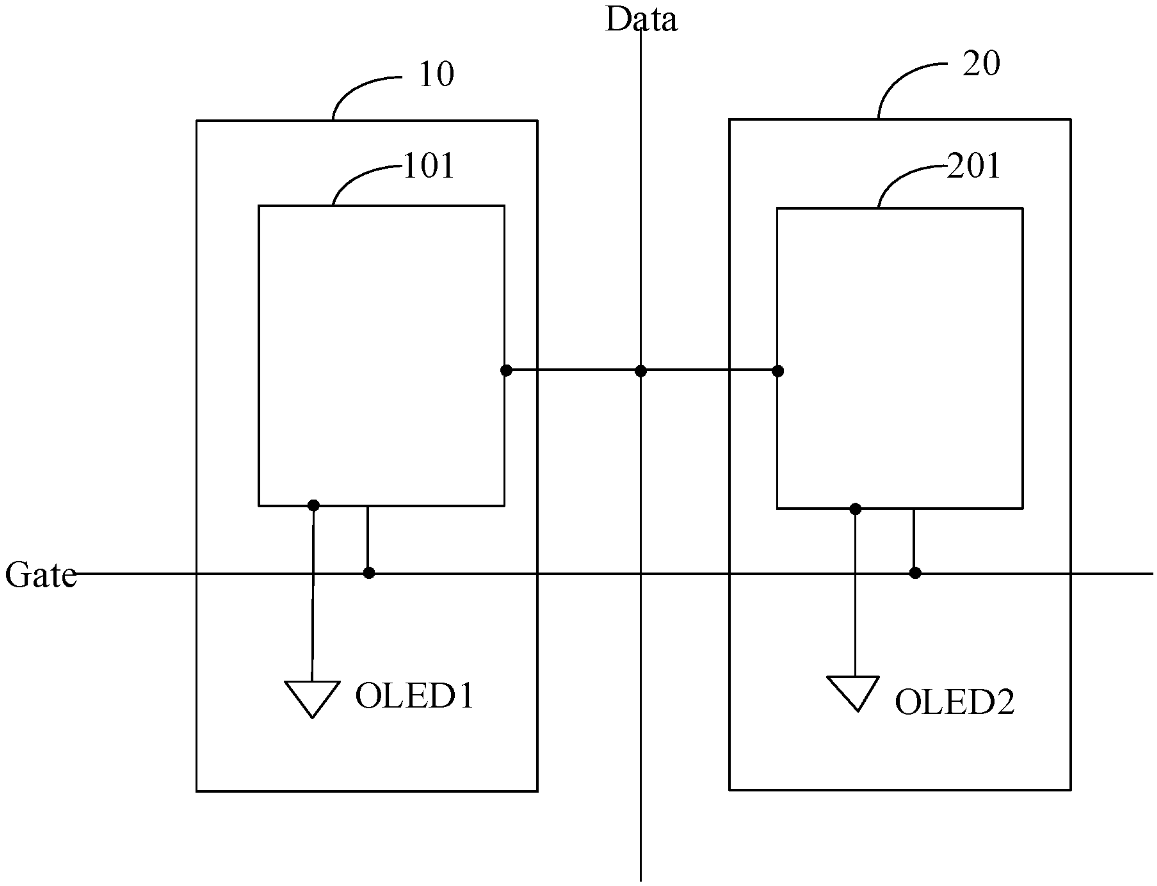
FIG. 1 is a schematic diagram illustrating an overall structure of a pixel compensation circuit provided in an embodiment of the present invention.

FIG. 1 is a schematic diagram illustrating an overall structure of a pixel compensation circuit provided in an embodiment of the present invention. As shown in FIG. 1, the pixel compensation circuit includes:

- a first compensation sub-circuit 101, configured to drive a first pixel unit 10;
- a second compensation sub-circuit 201, configured to drive a second pixel unit 20;
- the first compensation sub-circuit 101 and the second compensation sub-circuit 201 are connected to a same data line Data and a same scan line Gate;
- display duration of each frame includes a first period t1 and a second period t2 in order, and in the first period t1, the first compensation sub-circuit 101 drives the first pixel unit 10 to emit light; in the second period t2, the first compensation sub-circuit 101 performs compensation and keeps the first pixel unit 10 emitting light and the second compensation sub-circuit 201 performs compensation and drives the second pixel unit 20 to emit light.

Specifically, the first compensation sub-circuit 101 and the second compensation sub-circuit 201 are connected to a same scan line Gate and a same data line Data. It is assumed that the display duration of each frame includes the first period t1 and the second period t2 in order. In the first period t1, the scan line Gate scans the first pixel unit 10 and the second pixel unit 20, the data line Data provides a first data voltage Vdata1, the first compensation sub-circuit 101 drives the first pixel unit 10 to emit light based on the first data voltage Vdata1, and the second compensation sub-circuit 201 releases the first data voltage Vdata1 such that the second pixel unit 20 does not receive the first data voltage Vdata1 and does not emit light. Next, in the second period t2, the scan line Gate stops scanning, the data line Data provides a second data voltage Vdata2, the first compensation sub-circuit 101 performs compensation and keeps the first pixel unit 10 emitting light, and the second compensation sub-circuit 201 performs compensation and drives the second pixel unit 20 to emit light based on the second data voltage Vdata2. In this way, a use of a same data line Data can make both the first pixel unit 10 and the second pixel unit 20 emit light in the display duration of each frame. Therefore, the number of the data lines Data can be reduced to a half, and it benefits in reducing pixel layout space and pixel size, thereby realizing high-resolution performance of the display panel.

It needs to be noted that since human eye can generally resolve 24 to 30 frames per second at most due to its limited speed in resolution, it is not obvious for human eye when it perceives a smaller number of displayed images per frame. That is, in the embodiment of the present invention, although only a half of the pixel units emit light in the first period t1 in the display duration of each frame and all of the pixel units emit light in the second period t2, what human eye perceives are normally displayed images.

It can be understood that the first pixel unit 10 and the second pixel unit 20 are generally pixel units arranged adjacent to each other in a same row in the display panel, that is, every two adjacent columns of pixel units share a same data line Data.

Figure 2:
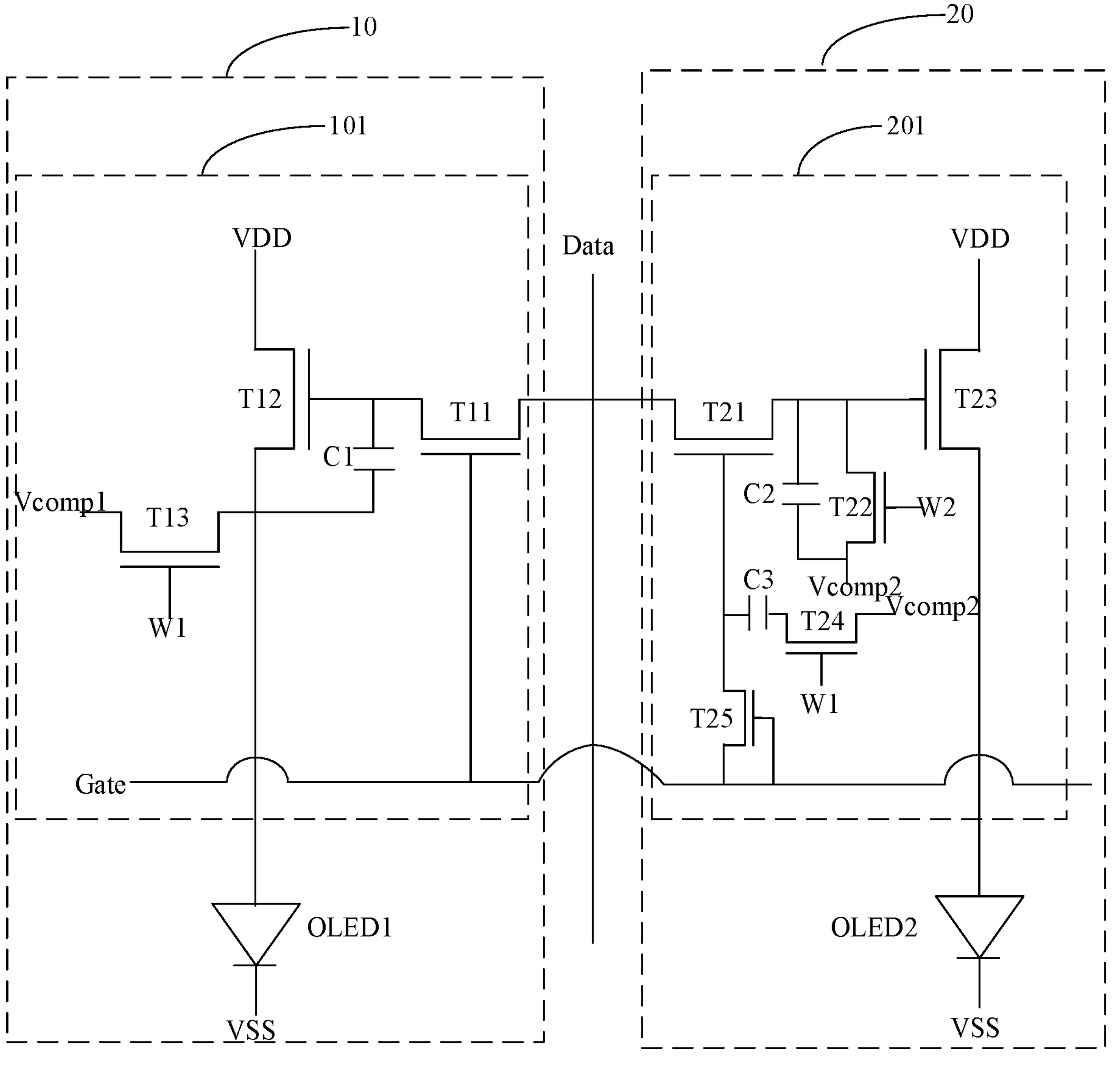
FIG. 2 is a schematic diagram illustrating a specific structure of a pixel compensation circuit provided in an embodiment of the present invention.

Based on the foregoing embodiment, FIG. 2 is a schematic diagram illustrating a specific structure of a pixel compensation circuit provided in an embodiment of the present invention. With reference to FIG. 1 and FIG. 2, the first compensation sub-circuit 101 includes an eleventh transistor T11, a twelfth transistor T12, a thirteenth transistor T13 and a first capacitor C1.

The gate of the eleventh transistor T11 is connected to the scan line Gate, the source of the eleventh transistor T11 is connected to the data line Data, and the drain of the eleventh transistor T11 is connected to the gate of the twelfth transistor T12 and a first end of the first capacitor C1. The source of the twelfth transistor T12 is connected to a constant high voltage level terminal VDD, and the drain of the twelfth transistor T12 is connected to a second end of the first capacitor C1 and the drain of the thirteenth transistor T13. The gate of the thirteenth transistor T13 is connected to a first compensation control line W1, and the source of the thirteenth transistor T13 is connected to a first compensation line Vcomp1.

Further, the second compensation sub-circuit 201 includes a twenty-first transistor T21, a twenty-second transistor T22, a twenty-third transistor T23, a twenty-fourth transistor T24, a twenty-fifth transistor T25, a second capacitor C2 and a third capacitor C3. The gate of the twenty-first transistor T21 is connected to the source of the twenty-fifth transistor T25 and a first end of the third capacitor C3, the source of the twenty-first transistor T21 is connected to the data line Data, and the drain of the twenty-first transistor T21 is connected to the gate of the twenty-third transistor T23, a first end of the second capacitor C2 and the drain of the twenty-second transistor T22. The source of the twenty-third transistor T23 is connected to the constant high voltage level terminal VDD. The gate and the drain of the twenty-fifth transistor T25 are connected to the scan line Gate. The gate of the twenty-second transistor T22 is connected to a second compensation control line W2, and the source of the twenty-second transistor T22 is connected to a reference signal line and a second end of the second capacitor C2. The gate of the twenty-fourth transistor T24 is connected to the first compensation control line W1, the source of the twenty-fourth transistor T24 is connected to a second compensation line Vcomp2, and the drain of the twenty-fourth transistor T24 is connected to a second end of the third capacitor C3.

Figure 3:
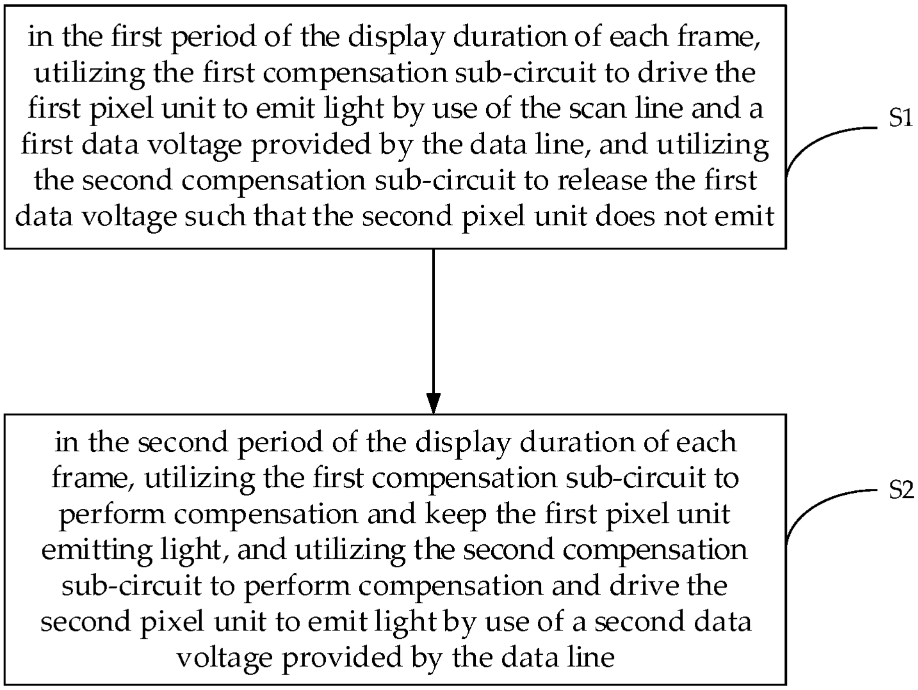
FIG. 3 is a schematic flowchart of a pixel compensation method provided in an embodiment of the present invention.

Based on the foregoing embodiments, FIG. 3 is a schematic flowchart of a pixel compensation method provided in an embodiment of the present invention. With reference to FIG. 2 and FIG. 3, the pixel compensation method includes the following steps:

In S1, in the first period t1 of the display duration of each frame, the first compensation sub-circuit 101 drives the first pixel unit 10 to emit light by use of the scan line Gate and the first data voltage Vdata1 provided by the data line Data, and the second compensation sub-circuit 201 releases the first data voltage Vdata1 such that the second pixel unit 20 does not emit light;

In S2, in the second period t2 of the display duration of each frame, the first compensation sub-circuit 101 performs compensation and keeps the first pixel unit 10 emitting light, and the second compensation sub-circuit performs compensation and drives the second pixel unit 20 to emit light by use of the second data voltage Vdata2 provided by the data line Data.

In the pixel compensation method provided in the embodiment of the present invention, firstly, in the first period t1 of the display duration of each frame, the first compensation sub-circuit 101 drives the first pixel unit 10 to emit light based on the first data voltage Vdata1 provided by the data line Data, and meanwhile the second compensation sub-circuit 201 releases the first data voltage Vdata1 provided by the data line Data such that the second pixel unit 20 does not emit light. After that, in the second period t2 of the display duration of each frame, the first compensation sub-circuit 101 performs compensation and keeps the first pixel emitting light, and meanwhile the second compensation sub-circuit 201 performs compensation and drives the second pixel unit 20 to emit light based on the second data voltage Vdata2 provided by the data line Data. In this way, a use of a same data line Data makes both the first pixel unit 10 and the second pixel unit 20 emit light in the display duration of each frame. Therefore, the number of the data lines Data is reduced to a half, and it benefits in reducing pixel layout space and pixel size, thereby realizing high-resolution performance of the display panel.

Figure 6:
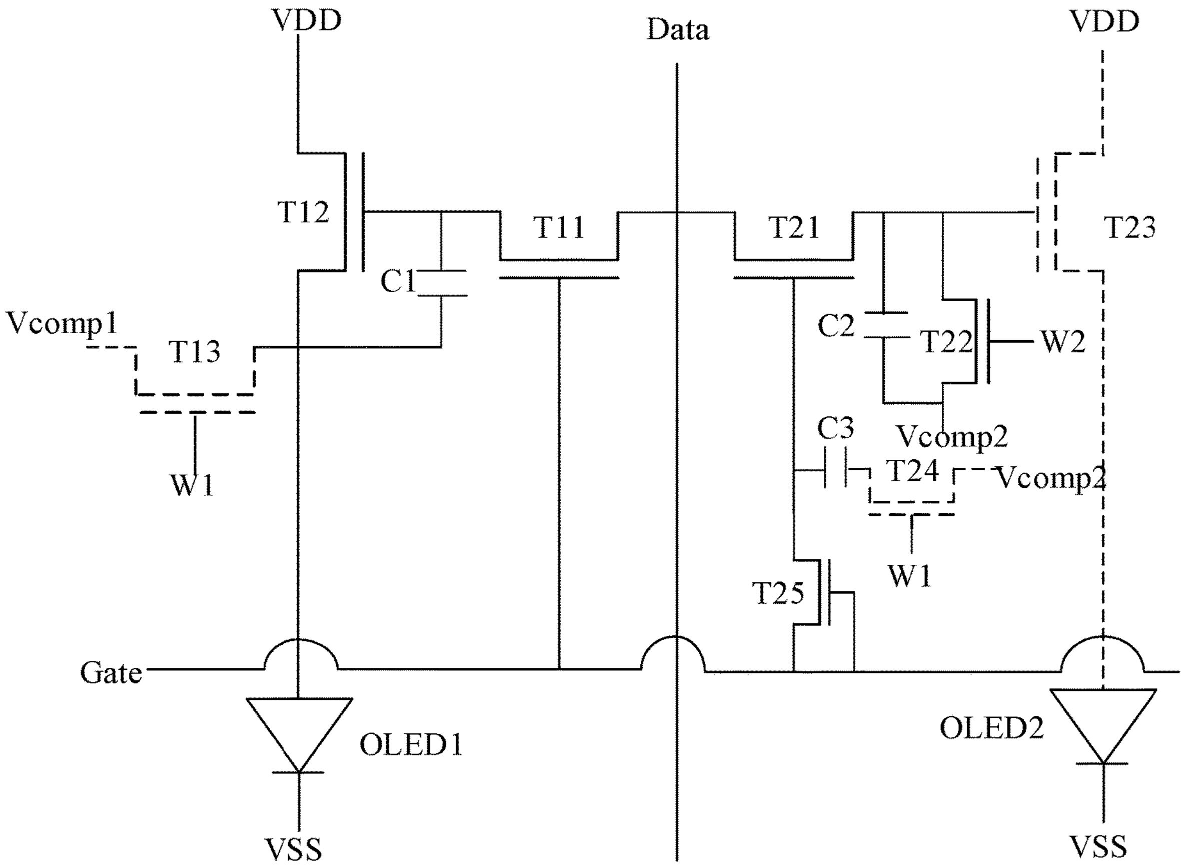
FIG. 6 is a schematic diagram illustrating the state of a pixel compensation circuit in a first period provided in an embodiment of the present invention.

It needs to be noted that FIG. 6 is a schematic diagram illustrating the state of a pixel compensation circuit in a first period provided in an embodiment of the present invention. As shown in FIG. 6, in the first period t1, the eleventh transistor T11, the twelfth transistor T12, the twenty-fifth transistor T25, the twenty-first transistor T21 and the twenty-second transistor T22 are turned on, and the thirteenth transistor T13, the twenty-third transistor T23 and the twenty-fourth transistor T24 are turned off. In the second period t2, the twelfth transistor T12, the thirteenth transistor T13, the twenty-first transistor T21 and the twenty-fourth transistor T24 are turned on, and the eleventh transistor T11, the twenty-second transistor T22 and the twenty-fifth transistor T25 are turned off.

Figure 4:
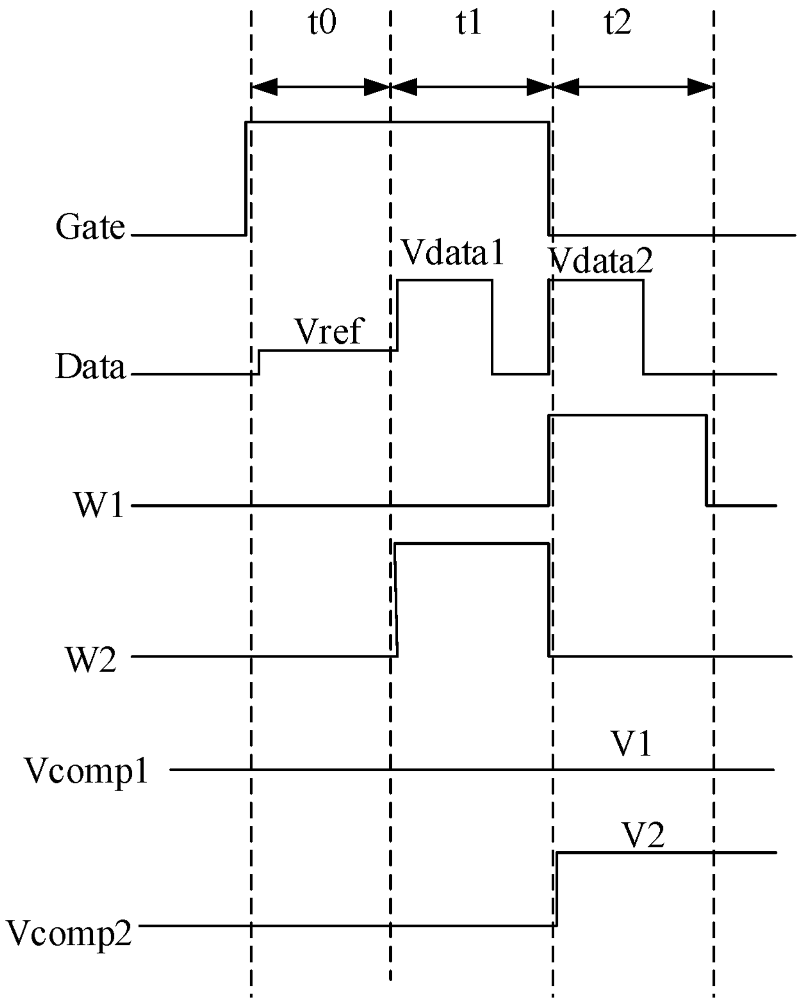
FIG. 4 is a schematic timing diagram of a pixel compensation circuit provided in an embodiment of the present invention.
Figure 7:
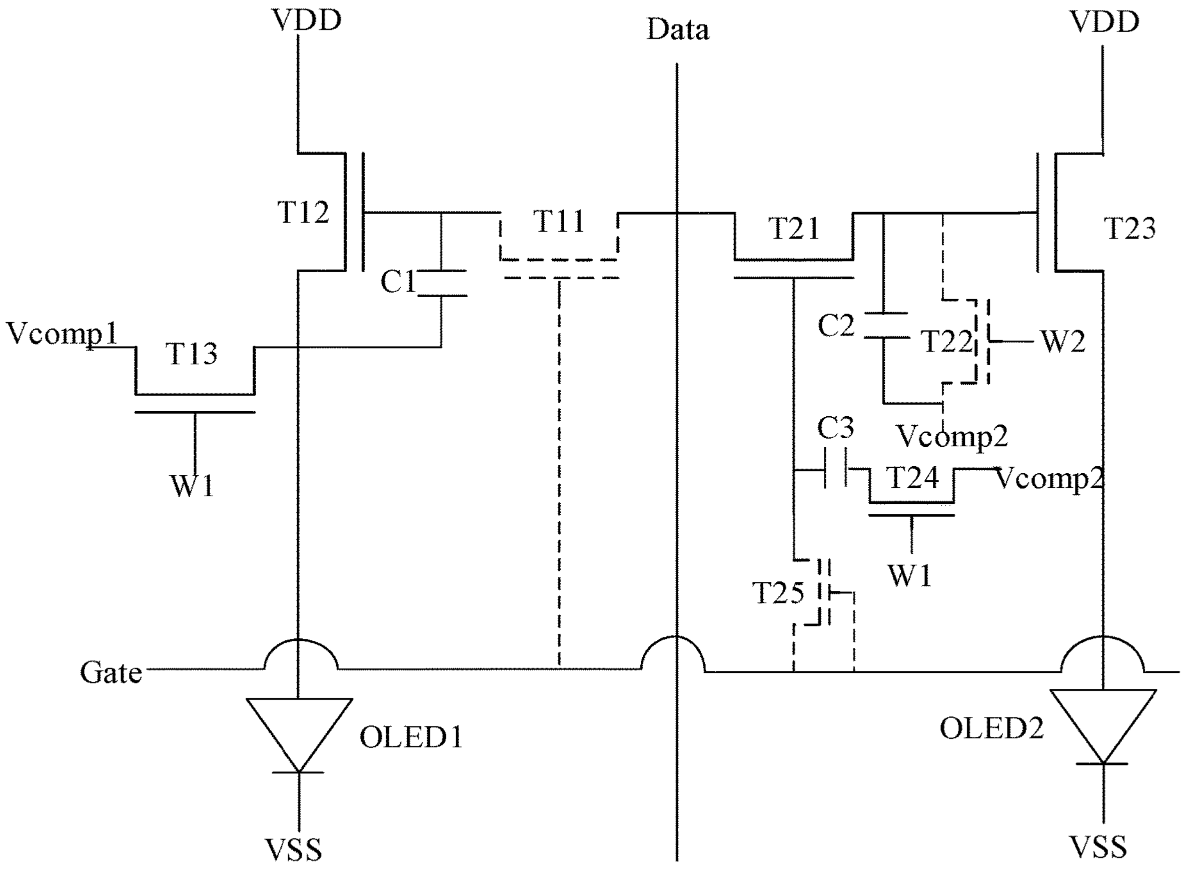
FIG. 7 is a schematic diagram illustrating the state of a pixel compensation circuit in a second period provided in an embodiment of the present invention.

It needs to be noted that FIG. 4 is a schematic timing diagram of a pixel compensation circuit provided in an embodiment of the present invention and FIG. 7 is a schematic diagram illustrating the state of a pixel compensation circuit in a second period provided in an embodiment of the present invention. With reference to FIG. 2, FIG. 4 and FIG. 7, in the first period t1, the scan line Gate and the second compensation control line W2 provide a high voltage level, the data line Data provides the first data voltage Vdata1, and the first compensation control line W1 and the second compensation line Vcomp2 provide a low voltage level. In the second period t2, the scan line Gate and the second compensation control line W2 provide a low voltage level, the data line Data provides the second data voltage Vdata2. The first compensation line Vcomp1 provides a first compensation voltage V1 so as to compensate the threshold voltage of the twelfth transistor T12 via the first capacitor C1. The second compensation line Vcomp2 provides a second compensation voltage V2 so as to compensate the threshold voltage of the twenty-third transistor T23 via the second capacitor C2 and keep the gate voltage of the twenty-first transistor T21 via the third capacitor C3.

Based on the foregoing embodiments, in order to effectively compensate the first pixel unit 10 by use of the first compensation sub-circuit 101 and effectively compensate the second pixel unit 20 by use of the second compensation sub-circuit 201 in step S2, before the first period t1, the pixel compensation method provided in the embodiment of the present invention further includes the following step:

In S0, in a detection period t0, by use of a reference voltage Vref provided by the scan line Gate and the data line Data, the first compensation sub-circuit 101 and the second compensation sub-circuit 201 detect the threshold voltage of the twelfth transistor T12 and the threshold voltage of the twenty-third transistor T23, respectively.

Figure 5:
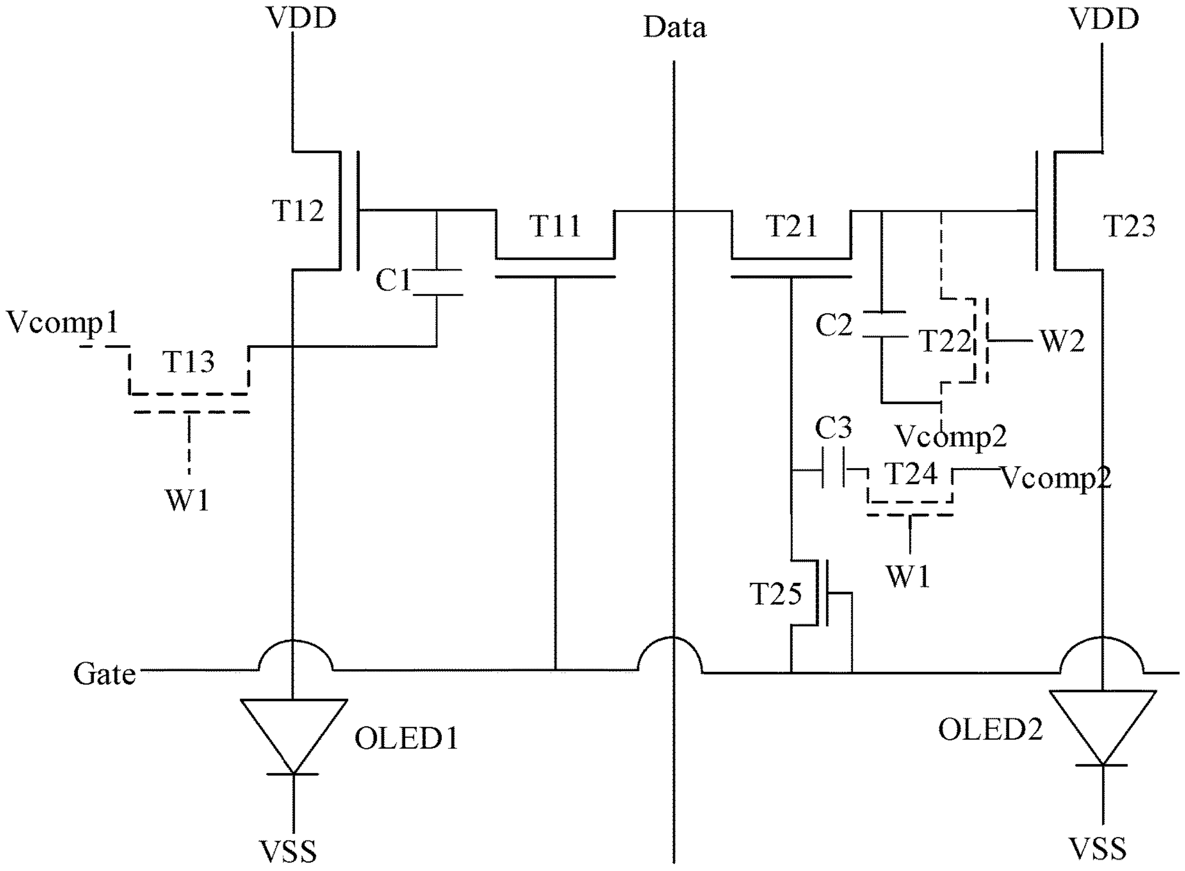
FIG. 5 is a schematic diagram illustrating the state of a pixel compensation circuit in a detection period provided in an embodiment of the present invention.

Specifically, FIG. 5 is a schematic diagram illustrating the state of a pixel compensation circuit in a detection period provided in an embodiment of the present invention. With reference to FIG. 2, FIG. 4 and FIG. 5, in the detection period t0, the scan line Gate provides a high voltage level such that the eleventh transistor T11, the twenty-fifth transistor T25 and the twenty-first transistor T21 are turned on. The data line Data provides the reference voltage Vref such that the twelfth transistor T12 and the twenty-third transistor T23 are turned on. The constant high voltage level terminal VDD lifts up the source potential of the twelfth transistor T12 and the source potential of the twenty-third transistor T23 until the potential difference Vgs12 between the gate and the source of the twelfth transistor T12 is less than the threshold voltage Vth12 of the twelfth transistor T12, that is, the source potential of the twelfth transistor T12 reaches Vref−Vth12 and the twelfth transistor T12 is turned off. Similarly, the potential difference Vgs23 between the gate and the source of the twenty-third transistor T23 is less than the threshold voltage Vth23 of the twenty-third transistor T23, that is, the source potential of the twenty-third transistor T23 reaches Vref−Vth23 and the twenty-third transistor T23 is turned off. Accordingly, based on the sources of the twelfth transistor T12 and the twenty-third transistor T23, the threshold voltage Vth12 of the twelfth transistor T12 and the threshold voltage of the twenty-third transistor T23 are detected, respectively.

It can be understood that it needs wires (not shown) connected to the source of the twelfth transistor T12 and the source of the twenty-third transistor T23 respectively when it is to detect the source potential of the twelfth transistor T12 and the source potential of the twenty-third transistor T23.

Based on the foregoing embodiments, an embodiment of the present invention further provides a display panel, which includes a first pixel unit 10, a second pixel unit 20 and the afore-described pixel compensation circuit. As shown in FIG. 1 or FIG. 2, the first pixel unit 10 includes a first organic light emitting diode OLED1, and the second pixel unit 20 includes a second organic light emitting diode OLED2. The first organic light emitting diode OLED1 is coupled between the drain of the twelfth transistor T12 of the first compensation sub-circuit 101 and a constant low voltage level terminal VSS. The second organic light emitting diode OLED2 is coupled between the drain of the twenty-third transistor T23 of the second compensation sub-circuit 201 and the constant low voltage level terminal VSS. The first compensation sub-circuit 101 and the second compensation sub-circuits 201 are configured to drive the first organic light emitting diode OLED1 to emit light in the first period t1 and the second period t2 that are arranged in order in display duration of each frame and to drive the second organic light emitting diode OLED2 to emit light in the second period t2. The display panel has a same structure and achieves a same beneficial effect as the pixel compensation circuit, which are not repeated herein for that the pixel compensation circuit has been described in detail in above embodiments.

Based on the foregoing embodiments, with reference to FIGS. 1 to 7, the working processes of the pixel compensation circuit are described in detail below. The working process includes a detection period t0, a first period t1 and a second period t2 in order.

In the detection period t0, the scan line Gate provides a high voltage level such that the eleventh transistor T11, the twenty-fifth transistor T25 and the twenty-first transistor T21 are turned on. The data line Data provides a reference voltage Vref such that the twelfth transistor T12 and the twenty-third transistor T23 are turned on. The constant high voltage level terminal VDD lifts up the source potential of the twelfth transistor T12 and the source potential of the twenty-third transistor T23 until the twelfth transistor T12 is turned off due to Vgs12<Vth12 and the twenty-third transistor T23 is turned off due to Vgs23<Vth23. Meanwhile, the source potential of the twelfth transistor T12 is Vref−Vth12 and the source potential of the twenty-third transistor T23 is Vref−Vth23. Therefore, based on the source potential of the twelfth transistor T12, the threshold voltage Vth12 of the twelfth transistor T12 is detected, and based on the source potential of the twenty-third transistor T23, the threshold voltage of the twenty-third transistor T23 is detected.

In the first period t1, the scan line Gate provides a high voltage level such that the eleventh transistor T11, the twenty-fifth transistor T25 and the twenty-first transistor T21 are turned on. The first compensation control line W1 provides a low voltage level such that the thirtieth transistor T13 and the twenty-fourth transistor T24 are turned off. The data line Data provides the first data voltage Vdata1 to turn on the twelfth transistor T12. The constant high voltage level terminal VDD drives the first organic light emitting diode OLED1 of the first pixel unit 10 to light up the first pixel unit 10. At this time, the first capacitor C1 and the third capacitor C3 are charged. Meanwhile, the second compensation control line W2 provides a high voltage level such that the twenty-second transistor T22 is turned on. The second capacitor C2 is shorted. The second compensation line Vcomp2 provides a low voltage level and releases the first data voltage Vdata1 such that the twenty-third transistor T23 is turned off. In this way, the second organic light emitting diode OLED2 of the second pixel unit 20 does not be lighted up.

In the second period t2, the scan line Gate provides a low voltage level such that the eleventh transistor T11 and the twenty-fifth transistor T25 are turned off. The first capacitor C1 keeps the twelfth transistor T12 being turned on such that the organic light emitting diode OELD1 of the first pixel unit 10 keeps lighting up. The first compensation control line W1 provides a high voltage level to turn on the thirteenth transistor T13 and the twenty-fourth transistor T24. The first compensation line Vcomp1 provides the first compensation voltage V1 and compensates the gate of the twelfth transistor T12 by use of the detected threshold voltage Vth 12 of the twelfth transistor T12 with a help of the coupling of the first capacitor C1. Meanwhile, the second compensation control line W2 provides a low voltage level to turn off the twenty-second transistor T22. The second compensation line Vcomp2 provides a second compensation voltage V2 and compensates the gate of the twenty-third transistor T23 by use of the detected threshold voltage Vth23 of the twenty-third transistor T23 with a help of the coupling of the second capacitor C2. Meanwhile, the second compensation line Vcomp2 also keeps the twenty-first transistor T21 being turned on with a help of the coupling of the third capacitor C3. The data line Data provides the second data voltage Vdata2 to turn on the twenty-third transistor T23. The constant high voltage level terminal VDD drives the second organic light emitting diode OLED2 of the second pixel unit 20 to be lighted up such that the second pixel unit 20 is lighted up.

A current flowing through a driving transistor is represented by $I=K(Vgs-Vth)^2$, where K is an intrinsic conductivity factor of the driving transistor, Vgs is a potential difference between the gate and the source of the driving transistor, and Vth is the threshold voltage of the driving transistor. Therefore, based on this formula, it can be known that the current flowing through the twelfth transistor T12 has nothing to do with the threshold voltage Vth12 of the twelfth transistor T12 and the current flowing through the twenty-third transistor T23 has nothing to do with the threshold voltage Vth23 of the twenty-third transistor T23. As a result, threshold voltage is compensated.

It should be understood that those of ordinary skill in the art may make equivalent modifications or variations according to the technical schemes and invention concepts of the present application, but all such modifications and variations should be within the appended claims of the present application.

The invention claimed is:

1. A pixel compensation circuit, comprising:

a first compensation sub-circuit, configured to drive a first pixel unit;

a second compensation sub-circuit, configured to drive a second pixel unit;

the first compensation sub-circuit and the second compensation sub-circuit are connected to a same data line and a same scan line;

display duration of each frame includes a first period and a second period in order, and in the first period, the first compensation sub-circuit drives the first pixel unit to emit light; in the second period, the first compensation sub-circuit performs compensation and keeps the first pixel unit emitting light and the second compensation sub-circuit performs compensation and drives the second pixel unit to emit light, wherein the first compensation sub-circuit comprises an eleventh transistor, a twelfth transistor, a thirteenth transistor and a first capacitor;

wherein a gate of the eleventh transistor is connected to the scan line, a source of the eleventh transistor is connected to the data line, a drain of the eleventh transistor is connected to the gate of the twelfth transistor and a first end of the first capacitor, the source of the twelfth transistor is connected to a constant high voltage level terminal, the drain of the twelfth transistor is connected to a second end of the first capacitor and the drain of the thirteenth transistor, the gate of the thirteenth transistor is connected to a first compensation control line, and the source of the thirteenth transistor is connected to a first compensation line;

wherein the second compensation sub-circuit comprises a twenty-first transistor, a twenty-second transistor, a twenty-third transistor, a twenty-fourth transistor, a twenty-fifth transistor, a second capacitor and a third capacitor; and wherein the gate of the twenty-first transistor is connected to the source of the twenty-fifth transistor and a first end of the third capacitor, the source of the twenty-first transistor is connected to the data line, the drain of the twenty-first transistor is connected to the gate of the twenty-third transistor, a first end of the second capacitor and the drain of the twenty-second transistor, the source of the twenty-third transistor is connected to the constant high voltage level terminal, the gate and the drain of the twenty-fifth transistor are connected to the scan line, the gate of the twenty-second transistor is connected to a second compensation control line, the source of the twenty-second transistor is connected to a second compensation line and a second end of the second capacitor, the gate of the twenty-fourth transistor is connected to the first compensation control line, the source of the twenty-fourth transistor is connected to the second compensation line, and the drain of the twenty-fourth transistor is connected to a second end of the third capacitor.

2. The pixel compensation circuit of claim 1, wherein:

in the first period, the eleventh transistor, the twelfth transistor, the twenty-fifth transistor, the twenty-first transistor and the twenty-second transistor are turned on and the thirteenth transistor, the twenty-third transistor and the twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

3. The pixel compensation circuit of claim 1, wherein:

in the first period, the scan line and the second compensation control line provide a high voltage level, the data line provides a first data voltage and the first compensation control line and the second compensation line provide a low voltage level; and in the second period, the scan line and the second compensation control line provide a low voltage level, the data line provides a second data voltage; the first compensation line provides a first compensation voltage to compensate a threshold voltage of the twelfth transistor via the first capacitor; the second compensation line provides a second compensation voltage to compensate a threshold voltage of the twenty-third transistor via the second capacitor and keeps a gate voltage of the twenty-first transistor via the third capacitor.

4. The pixel compensation circuit of claim 1, wherein in a detection period before the first period, by use of a reference voltage provided by the scan line and the data line, the first compensation sub-circuit and the second compensation sub-circuit detect a threshold voltage of the twelfth transistor and a threshold voltage of the twenty-third transistor, respectively.

5. A pixel compensation method, used for the pixel compensation circuit of claim 1, the pixel compensation method comprising the steps of:

in the first period of the display duration of each frame, utilizing the first compensation sub-circuit to drive the first pixel unit to emit light by use of the scan line and a first data voltage provided by the data line, and utilizing the second compensation sub-circuit to release the first data voltage such that the second pixel unit does not emit light; and in the second period of the display duration of each frame, utilizing the first compensation sub-circuit to perform compensation and keep the first pixel unit emitting light, and utilizing the second compensation sub-circuit to perform compensation and drive the second pixel unit to emit light by use of a second data voltage provided by the data line.

6. The pixel compensation method of claim 5, wherein:

in the first period, an eleventh transistor, a twelfth transistor, a twenty-fifth transistor, a twenty-first transistor and a twenty-second transistor are turned on and a thirteenth transistor, a twenty-third transistor and a twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

7. The pixel compensation method of claim 6, wherein:

in the first period, the scan line and a second compensation control line provide a high voltage level, the data line provides a first data voltage and a first compensation control line and the second compensation line provide a low voltage level; and in the second period, the scan line and the second compensation control line provide a low voltage level, the data line provides a second data voltage; a first compensation line provides a first compensation voltage to compensate a threshold voltage of the twelfth transistor via a first capacitor; a second compensation line provides a second compensation voltage to compensate a threshold voltage of the twenty-third transistor via a second capacitor and keeps a gate voltage of the twenty-first transistor via a third capacitor.

8. The pixel compensation method of claim 6, wherein before the first period, the pixel compensation method further comprises the following step:

in a detection period, by use of a reference voltage provided by the scan line and the data line, utilizing the first compensation sub-circuit and the second compensation sub-circuit to detect a threshold voltage of the twelfth transistor and a threshold voltage of the twenty-third transistor, respectively.

9. The pixel compensation circuit of claim 8, wherein in the detection period, by use of the reference voltage provided by the scan line and the data line, the utilizing the first compensation sub-circuit to detect the threshold voltage of the twelfth transistor comprises:

providing a high voltage level by the scan line to turn on the eleventh transistor;

providing the reference voltage by the data line to turn on the twelfth transistor;

lifting up a source potential of the twelfth transistor by a constant high voltage level terminal until the twelfth transistor is turned off such that the threshold voltage of the twelfth transistor is detected from a source of the twelfth transistor.

10. The pixel compensation method of claim 9, wherein in the second period, a gate of the twelfth transistor is compensated by use of the detected threshold voltage of the twelfth transistor with a help of a first compensation voltage provided by a first compensation line.

11. The pixel compensation method of claim 8, wherein in the detection period, by use of the reference voltage provided by the scan line and the data line, the utilizing the second compensation sub-circuit to detect the threshold voltage of the twenty-third transistor comprises:

providing a high voltage level by the scan line to turn on the twenty-fifth transistor and the twenty-first transistor;

providing the reference voltage by the data line to turn on the twenty-third transistor;

lifting up a source potential of the twenty-third transistor by a constant high voltage level terminal until the twenty-third transistor is turned off such that the threshold voltage of the twenty-third transistor is detected from a source of the twenty-third transistor.

12. The pixel compensation method of claim 11, wherein in the second period, a gate of the twenty-third transistor is compensated by use of the detected threshold voltage of the twenty-third transistor with a help of a second compensation voltage provided by a second compensation line.

13. A display panel, comprising a first pixel unit, a second pixel unit and the pixel compensation circuit of claim 1;

the first pixel unit comprises a first organic light emitting diode, and the second pixel unit comprises a second organic light emitting diode; the first organic light emitting diode is coupled between a drain of the twelfth transistor of the first compensation sub-circuit of the pixel compensation circuit and a constant low voltage level terminal; the second organic light emitting diode is coupled between a drain of the twenty-third transistor of the second compensation sub-circuit of the pixel compensation circuit and the constant low voltage level terminal, wherein the first compensation sub-circuit and the second compensation sub-circuits are configured to drive the first organic light emitting diode to emit light in the first period and the second period that are arranged in order in display duration of each frame and to drive the second organic light emitting diode to emit light in the second period.

14. The display panel of claim 13, wherein:

in the first period, the eleventh transistor, the twelfth transistor, the twenty-fifth transistor, the twenty-first transistor and the twenty-second transistor are turned on and the thirteenth transistor, the twenty-third transistor and the twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

15. The display panel of claim 13, wherein:

in the first period, the scan line and the second compensation control line provide a high voltage level, the data line provides a first data voltage and the first compensation control line and the second compensation line provide a low voltage level; and in the second period, the scan line and the second compensation control line provide a low voltage level, the data line provides a second data voltage; the first compensation line provides a first compensation voltage to compensate a threshold voltage of the twelfth transistor via the first capacitor; the second compensation line provides a second compensation voltage to compensate a threshold voltage of the twenty-third transistor via the second capacitor and keeps a gate voltage of the twenty-first transistor via the third capacitor.

16. The display panel of claim 13, wherein in a detection period before the first period, by use of a reference voltage provided by the scan line and the data line, the first compensation sub-circuit and the second compensation sub-circuit detect a threshold voltage of the twelfth transistor and a threshold voltage of the twenty-third transistor, respectively.

17. A pixel compensation method, used for a pixel compensation circuit comprising: a first compensation sub-circuit, configured to drive a first pixel unit; a second compensation sub-circuit, configured to drive a second pixel unit; the first compensation sub-circuit and the second compensation sub-circuit are connected to a same data line and a same scan line; display duration of each frame includes a first period and a second period in order, and in the first period, the first compensation sub-circuit drives the first pixel unit to emit light; in the second period, the first compensation sub-circuit performs compensation and keeps the first pixel unit emitting light and the second compensation sub-circuit performs compensation and drives the second pixel unit to emit light, the pixel compensation method comprising the steps of:

in the first period of the display duration of each frame, utilizing the first compensation sub-circuit to drive the first pixel unit to emit light by use of the scan line and a first data voltage provided by the data line, and utilizing the second compensation sub-circuit to release the first data voltage such that the second pixel unit does not emit light; and in the second period of the display duration of each frame, utilizing the first compensation sub-circuit to perform compensation and keep the first pixel unit emitting light, and utilizing the second compensation sub-circuit to perform compensation and drive the second pixel unit to emit light by use of a second data voltage provided by the data line;

wherein:

in the first period, an eleventh transistor, a twelfth transistor, a twenty-fifth transistor, a twenty-first transistor and a twenty-second transistor are turned on and a thirteenth transistor, a twenty-third transistor and a twenty-fourth transistor are turned off; and in the second period, the twelfth transistor, the thirteenth transistor, the twenty-first transistor and the twenty-fourth transistor are turned on and the eleventh transistor, the twenty-second transistor and the twenty-fifth transistor are turned off.

* * * * *